United States Patent
Deiner et al.

[11] 3,876,635
[45] Apr. 8, 1975

[54] PRODUCTION OF PHOSPHORUS CONTAINING ALKYL GUANAMINES

[75] Inventors: Hans Deiner, Neusaas-Lohwald; Hubert Freitag, Augsburg, both of Germany

[73] Assignee: Chemische Fabrik Pfersee GmbH, Augsburg, Germany

[22] Filed: May 24, 1972

[21] Appl. No.: 256,594

[30] Foreign Application Priority Data
May 29, 1971  Germany............................ 2126880

[52] U.S. Cl............ 260/249.9; 260/830 R; 117/136
[51] Int. Cl.............................................. C07d 55/20
[58] Field of Search.................................. 260/249.9

[56] References Cited
UNITED STATES PATENTS

| | | | |
|---|---|---|---|
| 2,822,364 | 2/1958 | Schuller.......................... | 260/249.9 |
| 3,305,436 | 2/1967 | Wohnsiedler................ | 260/249.9 X |
| 3,551,422 | 12/1970 | Tesoro et al..................... | 260/249.9 |

*Primary Examiner*—John M. Ford
*Attorney, Agent, or Firm*—Richards & Geier

[57] ABSTRACT

A process is used for producing alkyl guanamine derivatives containing phosphorus and having the following general formulas:

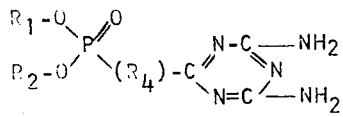

I or

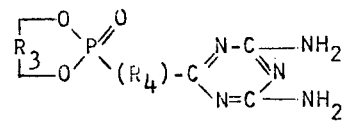

II wherein $R_1$ and $R_2$ are the same or different alkyl residues with 1 to 4 carbon atoms, $R_3$ is an alkylene residue with 2 to 6 carbon atoms and $R_4$ is an alkylene residue of the general formula

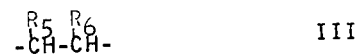

III

, whereby $R_5$ and $R_6$ are hydrogen or a methyl group. The process is characterized by reacting a. phosphite dialkylester having the general formulas

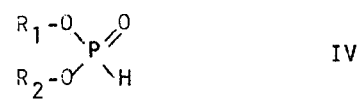

IV or

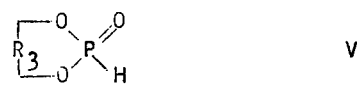

V wherein $R_1$, $R_2$ and $R_3$ have the above-indicated meaning, with b. unsaturated nitriles of the general formula

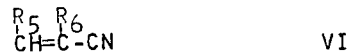

VI wherein $R_5$ and $R_6$ also have the above-indicated meaning, and with c. dicyandiamide in a substantially equimolecular ratio in the presence of alkali acting catalysts under greatly water-free conditions.

8 Claims, No Drawings

PRODUCTION OF PHOSPHORUS CONTAINING ALKYL GUANAMINES

This invention relates to a process for producing alkyl guanamine derivatives containing phosphorus and to their uses.

U.S. Pat. No. 3,551,422 describes the manufacture of triazinyl phosphonic acid esters by reacting among others 3-(dialkyl phosphonium) — propionitriles with dicyandiamide in an alcoholic solution, wherein long time periods are necessary for a complete reaction. These products are suitable as flame deterring agents for cellulose in the form of their methylol compounds or as their ethers with low alcohols, by themselves, but also in combination with organic nitrogen compounds.

A substantial drawback in the manufacture of triazinyl phosphonic acid esters consists in that they can be produced only by complicated at least two stage reactions, whereby dialkyl phosphonium alkyl nitriles required as intermediate products must be first produced separately and must be preferably distilled prior to the reaction, so as to produce these intermediate products in pure form and thus provide a smooth reaction. The manufacture of dialkyl phosphonium alkyl nitriles is described, for example, in the works of A. N. Pudovik and N. I. Plakatina, Sbornik Statei Obshchei Khim. 2,831-36(1953), described in Chemical Abstracts, vol. 49, sec. 6821 c.

An object of the present invention is to improve prior methods.

Other objects of the present invention will become apparent in the course of the following specification.

The present invention is based substantially on the discovery that compounds of the general formulas

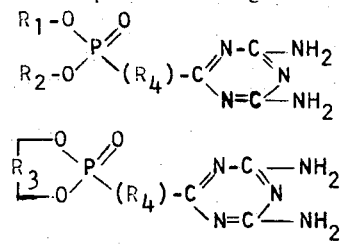

wherein $R_1$ and $R_2$ are the same or different alkyl residues with 1 to 4 carbon atoms, $R_3$ is an alkalyne residue with 2 to 6 carbon atoms and $R_4$ is an alkalyne residue of the general formula

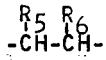

, wherein $R_5$ and $R_6$ are hydrogen or a metyl group, can be produced in a particularly simple manner by reacting a. compounds of the formulas

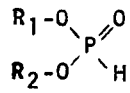 IV or 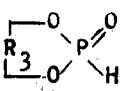 V wherein $R_1$, $R_2$ and $R_3$ have the above-indicated meaning, with b. unsaturated nitriles of the general formula

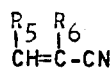 VI wherein $R_5$ and $R_6$ also have the above-indicated meaning, and with c. dicyandiamide in the presence of alkali acting catalysts.

It is apparent that when taking into consideration the teachings of prior art it is most surprising and could not be anticipated that when the three initial substances would be used it would be possible to obtain compounds of the general formulas I or II, particularly since prior art teaches that only the use of a pure 3 -(dialkyl phosphonium) — propionitrile along with dicyandiamide namely, the use of only two components, can result in similar compounds after a long time reaction. It is particularly surprising that according to the process of the present invention despite the use of three initial compounds the compounds of the formulas I or II can be produced after substantially shorter reaction time periods.

The compounds of the formulas I or II which are thus produced are suitable as flame preventing additions for artificial resins or also as hardening means for epoxyresins.

As initial compounds for the formula IV can be used dialkylesters of phosphoric acid, as, for example, diesters of phosphoric acid with methanol, ethanol, isopropanol or n-butanol, preferably however diethyl phosphite. As initial compounds for the formula V can be used esters which are derived from bivalent alcohols, such as ethylene, propylene or butylene glycol. Particularly suitable are the alkylene phosphites which derived from propandiol -.(1,2), butandiol - (2,3), propandiol -(1,3), butandiol - (1,3) and 2,2 - dimethylpropandiol - (1,3).

As compounds for the formula VI can be used simple unsaturated nitriles, such as acryl nitrile, methacryl nitrile or crotonic acid nitrile. Preferred is acryl nitrile.

Dicyandiamide is used in its commercially available technical quality.

As alkali acting catalysts can be used particularly alkali metals, preferably sodium and potassium and alkali metal alcoholates of lower alcohols, preferably methylates and ethylates of sodium and potassium.

The three above-mentioned components, namely, phosphite diester, unsaturated nitrile and dicyandiamide are reacted with each other in a substantially equimolecular ratio. The alkali acting catalyst is used in amounts of at least 0.12 mol, particularly 0.15 to 0.2 mol per mol of the used phosphite diester. The amount of the catalyst must be sufficient to set the reaction mixture to a pH of at least 10, preferably 10.5 to 11.0.

The reaction is carried out at a temperature of −10°C to 120°C, preferably between 10°C to 80°C in a suitable polar solvent, such as dioxane, dimethylformamide, methanol or propanol. Dioxane was found to be particularly suitable as a solvent. It is important to carry out the reaction under extensive water-free conditions, since otherwise uncontrollable side reactions can easily take place, so that products are produced which are not uniform and of lesser utility.

The reaction itself is exothermic. It was found advisable although not absolutely necessary, to cool the reaction during the exothermic phase.

The possibly used solvent is removed after the reaction is completed, preferably by distillation under lowered pressure.

The products of the formulas I or II are produced as viscous oils which are soluble in water, low alcohols and dimethylformamide. They are not soluble in carbohydrates, benzol, chlorated carbohydrates and the like.

If desired, the products thus obtained can be reacted with formaldehyde under usual conditions to produce corresponding methylol compounds. The amount of formaldehyde can be then so selected that only a partial or a complete substitution of amino-hydrogen atoms of the aminogroups of the triazine ring takes place. The methylol compounds can be thereupon possibly etherified with an alcohol containing at most 4 carbon atoms in the usual manner.

The methylol compounds or their ethers with low monovalent alcohols can be used for flame safety of cellulosic materials. Then about 320 – 600 gr./l. of these compounds (100 percent) are dissolved in water with a catalyst, particularly an amine - or alkanolamine hydrochloride, the cellulosic materials are impregnated in the bath which is thus produced and are then ready made in the known manner by foularding, drying and condensing. Up to 50 gr. per liter of known melamine resins can be added to the treating bath.

The use of products made in accordance with the present invention results in an exceptionally good flame resistance (as determined by German norms DIN53906) which also remains after numerous boiling washings.

As cellulosic materials can be used all textiles consisting completely or predominantly of natural or regenerated cellulose fibers.

The following examples are given by way of exemplification only:

EXAMPLE 1

Variant A 138 gr. (1 mol) diethylphosphite, 53 gr. (1 mol) acrylnitrile and 84 gr. (1 mol) dicyandiamide are introduced into a round flask provided with a stirrer, drop funnel, reflux cooler and thermometer. After the addition of 100 ml water-free dioxane there are added by drops while stirring within about 1/2 hour 58 ml of a 3.33 n sodium methylate solution in methanol. The temperature is held by cooling at 10°C. Thereupon it is heated for 2 hours for boiling under refluxing, whereby a homogenous solution is formed after about 1 hour.

After removing the solvent by distillation under diminished pressure the desired product is obtained as a viscous oil which after a few hours is solidified as a wax-like crystalline mass.

Varient B

The amount ratii are the same as indicated in Variant A. According to this variant there is no cooling during 45 to 60 minutes during the drop-wise addition of the alcoholic sodium methylate solution. Due to the exothermic reaction the reaction mixture is heated by itself to about 80°C. Thereupon it is heated for 2 hours for boiling under refluxing, and then treated as in Variant A. In this case the resulting reaction product has a light yellow color.

Equally good products are obtained according to both variants when instead of 1 mol dicyandiamide only 0.85 mol are used in the reaction.

EXAMPLE 2

152 gr. (1 mol) dipropylphosphate, 67 gr. (1 mol) crotonic acid nitrile and 76 gr. (0.9 mol) dicyandiamide are introduced into a round flask provided with a stirrer, drop funnel, reflux cooler and a thermometer. After the addition of 120 ml water-free dimethylformamide there are added by drops while stirring within about 1/2 hour 85 ml. of a 2,5 n sodium ethylate solution in ethanol. The temperature is kept by cooling at 35°C. Thereupon it is heated for 3 hours to a temperature of 90°C under reflux cooling (dimethylformamide: b.p. 152.8°C), whereby a homogenous solution is formed after about 1½ hours.

After distilling off the solvent under diminished pressure a wax-like crystalline end product is produced of yellow-brown color.

EXAMPLE 3

138 gr. (1 mol) diethylphosphite, 61 gr. (1 mol) methacrylnitrile and 84 gr. (1 mol) dicyandiamide are introduced into a round flask provided with a stirrer, drop funnel, reflux cooler and thermometer. After the addition of 100 ml. water-free n-propyl alcohol there are added by drops while stirring within about ½ hour 60 ml. of a 2,0 n potassium methylate solution in methanol. The temperature is kept by cooling at 70°C. Thereupon it is heated for 2½ hours with reflux cooling to a temperature of 85°C (propanol: b.p. 97.2°C), whereby a homogenous solution is formed after about 1½ hours.

Oil thus produced which is highly viscous and yellowish, solidifies after long standing into a wax-like crystalline mass.

EXAMPLE 4

108 gr. (1 mol) ethylene phosphite, 53 gr. (1 mol) acrylnitrile and 67 gr. (0.8 mol) dicyandiamide are introduced into a round flask provided with a stirrer, drop funnel, reflux cooler and thermometer. After the addition of 100 ml. water-free dioxane there are added by drops while stirring within about ½ hour 58 ml. of a 3,33 n potassium ethylate solution in ethanol. The temperature is kept by cooling at 50°C. Thereupon it is heated for 2½ hours to boiling with refluxing, whereby a homogenous solution is produced after about 1 hour.

The colorless viscous oil solidifies after long standing into a wax-like crystalline mass.

EXAMPLE 5

138 gr. (1 mol) diethylphosphite, 53 gr. (1 mol) acrylnitrile and 76 gr. (0.9 mol) dicyandiamide are introduced into a round flask provided with a stirrer, drop funnel, reflux cooler and thermometer. After the addition of 100 ml. water-free dioxane there are added within about 1½ hours while stirring finely divided in 3 portions 4.44 gr. Na metal. The temperature is held by cooling at 20°C. Thereupon it is heated for 2½ hours to boiling with refluxing, whereby a homogenous solution is formed after about 1 hour.

After removing the solvent by distillation under diminished pressure the desired product is obtained as a practically colorless viscous oil which after some standing solidifies to a wax-like crystalline mass.

EXAMPLE 6

136 gr. (1 mol) of an alkylene phosphite having the formula

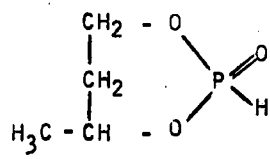

53 gr. (1 mol) acrylnitrile and 84 gr. (1 mol) dicyandiamide are introduced into a round flask provided with a stirrer, drop funnel, reflux cooler and thermometer. After the addition of 100 ml. water-free dioxane there are added by drops within about ½ hour 85 ml. of a 2.5 n sodium ethylate solution in ethanol. The temperature is kept by cooling at 35°C – 40°C. Thereupon it is heated for 3 hours with reflux cooling to a temperature of 90°C, whereby a homogenous solution is formed after about 1½ hours.

After removing the solvent by distillation under diminished pressure the desired product is obtained as a highly viscous light yellowish oil which after long standing solidifies into a wax-like mass.

EXAMPLE 7

340 gr. (1 mol) of 2,2-bis(p-hydroxyphenyl)-propane-diglycideether and 275 gr. (1 mol) of alkyl guanamine derivative produced according to Example 1 are stirred jointly in a flask and are heated to 140°C. This artificial resin pre-condensate can be then hardened at temperatures between 150°C to 170°C into a yellowish transparent film insoluble in water and solvents.

If this epoxydresin is held in the flame of a Bunsen burner it will start burning only with great difficulty and the flame is immediately extinguished after the Bunsen burner is removed. On the other hand, epoxydresins hardened with amines in the usual manner are easily ignited and continue to burn strongly after the removal of the flame.

EXAMPLE 8

1 mol (275 gr.) of an alkyl guanamine phosphorous compound produced according to Example 1 (Variant A) is reacted with 60 gr. (2 mol) of formaldehyde in the form of a 37 percent aqueous solution, the pH value is set to 8.5 with a 50 percent aqueous caustic soda and it is then methylolated while stirring for 3 hours at 60°C. A corresponding dimethylol compound is produced.

For making it flame resistant, a cotton atlas (300 gr. per qm) is saturated with a bath containing 600 gr. per liter of the solution of dimethylol compound produced as described above and 40 gr. per liter of a 36 percent aqueous solution of 2-methyl-2-aminopropanolhydrochloride, is squeezed to 70 percent bath reception, dried and condensed for 5 minutes at 160°C. The cotton fabric thus treated has a subsequent burning time and subsequent glow time of zero seconds (determined according to German norms DIN53906). The flame resistance of the fabrics remains after 25 boiling washings.

During the flame resisting treatment it is also possible to use 40 gr. per liter of the commercially available pentamethyolmelamine methyl ether.

What is claimed is:

1. A process for producing alkyl guanamines containing phosphorus and having the formulas

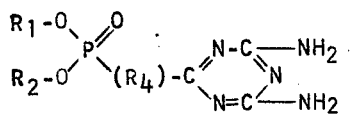

or

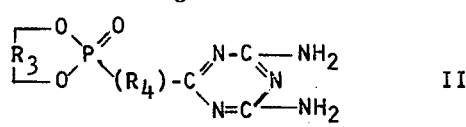

wherein $R_1$ and $R_2$ are the same or different alkyl groups with 1 to 4 carbon atoms, $R_3$ is an alkylene group with 2 to 6 carbon atoms and $R_4$ is an alkylene group of the formula

whereby $R_5$ and $R_6$ are hydrogen or a methyl group, the process comprising reacting
a. phosphite dialkylester having the formulas

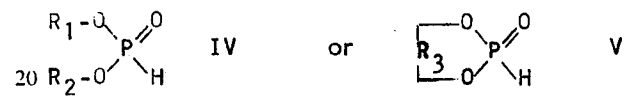

wherein $R_1$, $R_2$ and $R_3$ have the above indicated meaning, with b. unsaturated nitriles of the formula

wherein $R_5$ and $R_6$ also have the above-indicated meaning and with c. dicyandiamide in a substantially equimolecular ratio in the presence of alkali acting catalyst selected from the group consisting of alkali metals and alkali metal alcoholates under greatly water-free conditions.

2. The process in accordance with claim 1, wherein the reaction takes place in a polar solvent.

3. The process in accordance with claim 2, wherein the reaction takes place in dioxane.

4. The process in accordance with claim 1, wherein the alkaline acting catalyst is selected from sodium, potassium, and methylates and ethylates of sodium and potassium.

5. The process in accordance with claim 1, comprising using in the reaction at least 0.12 mol of the alkaline acting catalyst per mol of the initial compound a).

6. The process in accordance with claim 5, comprising using in the reaction from 0.15 to 0.2 mol of the alkaline acting catalyst per mol of the initial compound a).

7. The process in accordance with claim 1, comprising using in the reaction as the initial compound b) acrylnitrile.

8. The process in accordance with claim 1, comprising using in the reaction as the initial compound a) diethylphosphite and alkylene phosphites having the formula V wherein $R_3$ are the groups

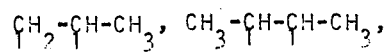

* * * * *